UNITED STATES PATENT OFFICE 2,558,667

POLYMERIZABLE ESTERS

Frank Armitage, Jack Andrews Cottrell, and Donald Helmsley Hewitt, Homerton, London, England; Ernest Booth and Richard Hartlebury Buckle, executors of Donald Helmsley Hewitt, deceased, assignors, by mesne assignments, to The Sherwin-Williams Company, Cleveland, Ohio, a corporation of Ohio No Drawing. Application April 13, 1946, Serial No. 662,095. In Great Britain April 17, 1945

10 Claims. (Cl. 260—404.8)

This invention is for improvements in or relating to the production of polymerisable esters and has for an object to provide a process for the production of esters which are capable of conversion by the application of heat to the insoluble, infusible state.

It is well known that many aliphatic unsaturated alcohols, such as the allyl and methallyl alcohols, will react with mono-basic organic acids to yield esters capable of polymerisation to form thermo-plastic polymers. It is also well known that the esters of such alcohols with polybasic acids are capable of being converted to the insoluble, infusible state on heating. Of the polybasic acids which have already been described, there are the simple dibasic acids of the succinic acid series, the inorganic polybasic acids, such as silicic and phosphoric acids, the acids derived from amphoteric inorganic oxides such as alumina and the unsaturated polycarboxylic acids such as maleic acid; the esters of such alcohols with the unsaturated monocarboxylic acids, such as acrylic acid and cinnamic acid, are also known to be convertible to the insoluble infusible state on heating.

According to the present invention, there is provided a process for the manufacture of polymerisable esters which comprises esterifying, with allyl or methallyl alcohol, a mono-substituted succinic acid or anhydride in which the substituent is an organic radicle containing not less than three carbon atoms; the substituent may advantageously be an unsaturated substituent such as occurs in alkenyl succinic acid anhydrides. It will be understood that in referring to methallyl alcohol we mean β-methyl allyl alcohol.

The substituted succinic acids produced by the addition reaction of maleic anhydride with a non-conjugated poly-unsaturated organic compound, such as a non-conjugated terpene or a drying oil fatty acid, are particularly suitable substituted succinic acids for use in the process of the present invention. The reaction between certain non-conjugated terpenes and maleic anhydride has been described in the literature by Littman in "Industrial and Engineering Chemistry" 1936, volume 28, No. 10, page 1150; a similar reaction has also been described in German specification No. 607,380 in which aromatic hydrocarbons having a saturated aliphatic or carboxylic side chain react with maleic anhydride at elevated temperatures to produce mono-substituted succinic acid derivatives, for example, toluene yields benzyl succinic acid; these processes appear to involve the presence of a mobile hydrogen atom which passes from the poly-unsaturated compound to the maleic anhydride residue during the reaction to yield a mono-substituted succinic acid; the reaction product does not always possess the expected, theoretical acid value but sometimes has an acid value considerably below that to be expected and it is believed that this lower acid value may be due to the formation, by means of a side reaction, of compounds in which there is only one carboxyl group, the other carboxyl group of the maleic anhydride residue having participated in the reaction.

The invention also comprises a modification of the above-described process according to which an alcoholysis reaction is effected between a lower alkyl ester of the said substituted succinic acid and allyl or methallyl alcohol, whereby there is produced the polymerisable ester required.

Various mono-substituted succinic acids, particularly those made by the high-temperature addition of maleic anhydride to non-conjugated poly-enes, such as certain terpenes, and to linseed oil or linseed oil fatty acids, have already been proposed. The esterification of these acids with poly-hydric alcohols is also known.

It has been proposed also to react the maleic acid esters of aliphatic unsaturated alcohols with fatty oils containing substantially no conjugated unsaturation. The products resulting from the last process differ considerably from the products of the present invention by reason of the fact that, when operating in accordance with the prior process, the unsaturated di-esters of maleic acid are liable to undergo considerable polymerisation during the reaction which is necessarily effected at a high temperature; in contradistinction therewith, the products of the present invention contain the radicles of the allyl or methallyl alcohol in the unpolymerised form due to the fact that the maleic acid addition product is preformed prior to the esterification or alcoholysis reactions with the allyl or methallyl alcohol.

The following examples illustrate the manner in which the invention may be carried into effect:

Example 1.—A di-methyl maleate addition product with the methyl esters of linseed oil fatty acids was prepared by heating equi-molecular proportions of di-methyl maleate and the methyl esters of linseed oil fatty acids at a temperature of 220° C. for 13 hours. After this time the unreacted di-methyl maleate, amounting to about 24% by weight of the amount originally added, was removed by distillation under reduced pressure. The residue was then fractionated at a pressure of 15 mms. and the fraction distilling over between 260° and 310° C. was collected.

300 grams of allyl alcohol (5 mols) was distilled under a column and the allyl alcohol-water binary mixture (boiling point 88° C.) was removed at the head of the column and the distillation was continued until the whole of the binary mixture had passed over. 2 grams of metallic sodium were then added and, when it had wholly dissolved, 100 grams (⅓ mol) of the di-methyl maleate adduct fraction above referred to was added to the mixture. The mixture was maintained at such a temperature that the vapour temperature at the top of the column did not exceed 75° C. and, as a result of this treatment, alcoholysis took place to form the di-allyl ester of the maleate adduct. The heating of the mixture was continued until the minimum vapour temperature attainable at the head of the column had risen to 90° C. Excess allyl alcohol was then removed by distillation and the residue was dissolved in ether and washed with water until it was free from alkali.

The ethereal extract was drived over calcium chloride and the ether removed by distillation.

The resultant product was an amber oil which, on heating over night at a temperature of 140° C., polymerised to a rubbery mass.

Example 2.—A mixture of 400 gms. maleic anhydride and 270 gms. dipentene was heated under reflux in an oil bath. At 120° C. no reaction had apparently occurred, but when the flask was shaken a violent exothermic reaction began, with resulting loss of about 120 gms. of the mixture. After the initial violence of the reaction had subsided the liquid was allowed to boil gently for 1 hour.

After cooling, the reaction mixture was washed with 1½ litres of water at 80–90° C., 126 gms. of unreacted maleic anhydride being thus removed. 4 further washing processes removed another 92 gms. of maleic anhydride.

The washed product was then dissolved in ether and separated from residual wash water. After distilling off ether, about 45 gms. of unreacted dipentene was distilled off and 220 gms. of a soft balsam remained having an acid value of 394.

180 gms. of the above product were then mixed with 400 gms. of allyl alcohol and 2 gms. of p. toluene sulphonic acid were then added. After refluxing the mixture for some 14 hours part of the allyl alcohol was removed by distillation and replaced with fresh allyl alcohol and the esterification process continued. Eventually an ester of sufficiently low acid value was obtained, and was freed from alcohol by pouring into water. The thick light-brown oil when separated from the water polymerised slowly in the presence of benzoyl peroxide at 130° to 140° C.

Example 3.—100 gms. of a mixture of mono-alkenyl substituted succinic anhydrides of acid value 490, containing alkenyl groups having from 8 to 10 carbon atoms, was refluxed with 200 gms. of allyl alcohol and 2 gms. of p. toluene sulphonic acid for 10 hours. 100 gms. of the alcohol was then removed by distillation and replaced by 200 gms. of fresh allyl alcohol and the reaction continued, until a reasonably low acid value had been arrived at. Some of the excess allyl alcohol was then removed by distillation and the residue poured into water. The separated ester was thoroughly shaken with an aqueous solution of barium hydroxide whereby the barium salt of the unchanged acid was precipitated. The ester was then dissolved in ether, and finally purified by vacuum distillation, when it distilled over at 200° to 205° C. under 8–9 mms. mercury pressure, as a light yellow oil.

The purified ester polymerised slowly at 140° C. in the presence of benzoyl peroxide.

Example 4.—A mixture of 528 gms. of raw linseed oil and 720 gms. maleic anhydride was heated under reflux at 170° to 176° C. for 1½ hours. A crystalline deposit was thrown down during the reaction, and was separated off whilst the mixture was still hot and washed 4 times with an excess of hot water whereby 110 gms. of unreacted maleic anhydride were removed. About 10 gms. of unreacted oil were also obtained. The washed reaction product was recrystallised from acetone and gave an acid value of 440.

160 gms. of the reaction product was mixed with 400 gms. of allyl alcohol and 2 gms. of p. toluene sulphonic acid and the mixture was refluxed for 15 hours to an acid value of 90 whereupon 300 gms. of alcohol were distilled off and replaced with 300 gms. of fresh allyl alcohol. The refluxing was further continued for 6 hours to an acid value of 15. Excess of allyl alcohol was then distilled off under vacuum leaving a brown oil. Some of this oil then distilled at 120° to 130° C. at ⅞ mms., which suggested that some splitting of the adduct to give diallyl maleate was taking place. The residual oil boiling above 130° C. at 6 mms. polymerised in the presence of benzoyl peroxide at 130° to 140° C. to a rubbery mass.

The nature of the products of the present invention may vary from oils to soft resins of the character of balsams.

The products of the present invention are particularly suitable for use in the surface-coating field since, by a suitable choice of the substituent in the succinic acid molecule, the products may have a viscosity which is sufficiently low to allow them to be used, in the absence of solvents, as coating compositions and impregnating compositions and similarly the volatility may be controlled so that the polymerisable ester does not boil or evolve a substantial quantity of vapours at the temperature of polymerisation. The products are also particularly suitable as bonding agents owing to the fact that they are convertible to the insoluble infusible state on heating.

The products of the present invention, therefore, can be used in bonding compositions, electrical insulating compounds, varnish compositions and surface-coating compositions and the invention includes such compositions particularly those containing no solvent.

The invention also includes fabricated products such as brake linings or plywood, in which the bonding agent is a polymerisable ester produced in accordance with the present invention.

The invention also includes a method of producing an insulated electrical conductor which comprises impregnating a coil, cable or the like with a selected polymerisable ester produced in accordance with the present invention and thereafter subjecting the impregnated electrical conductor to the action of heat whereby the said polymerisable ester is thermo-hardened.

Polymerisation catalysts, e. g. benzoyl peroxide, are generally necessary in the polymerisation of the esters of this invention.

What we claim is:

1. A polymerizable succinic acid ester having the formula $$ROOC-CH_2-\underset{\underset{R'}{|}}{CH}-COOR$$

wherein R' represents a substituent having not less than three carbon atoms, one of said carbon atoms being directly connected to the carbon atom of said ester, and wherein R represents a radical selected from the class consisting of allyl and methallyl radicals.

2. A polymerizable succinic acid ester having the formula $$CH_2=CH-CH_2OOC-CH_2-\underset{\underset{R'}{|}}{CH}-COOCH_2-CH=CH_2$$

wherein R' represents a substituent having not less than three carbon atoms, one of said carbon atoms being directly connected to the carbon atom of said ester.

3. A polymerizable succinic acid ester having the formula $$CH_2=\underset{\underset{CH_3}{|}}{C}-CH_2OOC-CH_2-\underset{\underset{R'}{|}}{CH}-COOCH_2-\underset{\underset{CH_3}{|}}{C}=CH_2$$

wherein R' represents a substituent having not less than three carbon atoms, one of said carbon atoms being directly connected to the carbon atom of said ester.

4. A polymerizable ester as claimed in claim 1 wherein R' represents an alkenyl radical.

5. A polymerizable ester as claimed in claim 1 wherein R' is a non-conjugated polyene radical.

6. A polymerizable ester as claimed in claim 1 wherein R' is a non-conjugated terpene radical.

7. A polymerizable ester as claimed in claim 1 wherein R' is a non-conjugated drying oil fatty acid radical.

8. A polymerizable ester as claimed in claim 1 wherein R' is a linseed oil fatty acid radical.

9. A surface coating composition containing a major proportion of the polymerizable ester claimed in claim 1.

10. A surface coating composition substantially free of volatile organic solvents containing a major proportion of the polymerizable ester claimed in claim 1.

FRANK ARMITAGE.
JACK ANDREWS COTTRELL.
DONALD HELMSLEY HEWITT.

REFERENCES CITED

The following references are of record in the file of this patent:

UNITED STATES PATENTS

| Number | Name | Date |
| --- | --- | --- |
| 2,067,054 | Humphrey | Jan. 5, 1937 |
| 2,188,887 | Clocker | Jan. 30, 1940 |
| 2,188,888 | Clocker | Jan. 30, 1940 |
| 2,218,439 | Rothrock | Oct. 15, 1940 |
| 2,262,002 | Hopff et al. | Nov. 11, 1941 |
| 2,275,034 | Moyle | Mar. 3, 1942 |
| 2,280,256 | Patterson | Apr. 21, 1942 |
| 2,280,862 | Sorenson | Apr. 28, 1942 |
| 2,311,259 | Staff et al. | Feb. 16, 1943 |
| 2,346,612 | Rothrock | Apr. 11, 1944 |
| 2,359,038 | Hopff et al. | Sept. 26, 1944 |
| 2,389,379 | McCulloch | Nov. 20, 1945 |

OTHER REFERENCES

Morrell et al. "Chem. Abstracts" vol. 37 (1943) pg. 6143.

Blagonravova et al. "Chem. Abstracts" vol. 38 (1944) pg. 4142.